E. M. COFFIN.

ELECTRIC SWITCH.

APPLICATION FILED JAN. 17, 1910.

Reissued May 10, 1910.

13,114.

WITNESSES:

F. C. Fliedner

N. B. Keating

INVENTOR

E. M. Coffin,

BY

Fm. Wright,

ATTORNEY

UNITED STATES PATENT OFFICE.

EVERETT M. COFFIN, OF OAKLAND, CALIFORNIA.

ELECTRIC SWITCH.

13,114. Specification of Reissued Letters Patent. Reissued May 10, 1910.

Original No. 881,300, dated March 10, 1908. Reissue No. 12,841, dated August 11, 1908, Serial No. 440,118.
Application for reissue filed January 17, 1910. Serial No. 538,562.

*To all whom it may concern:*

Be it known that I, EVERETT M. COFFIN, a citizen of the United States, residing at Oakland, in the county of Alameda and State of California, have invented certain new and useful Improvements in Electric Switches, of which the following is a specification.

This invention relates to improvements in electric switches, the object of the invention being to provide an electric switch which can be made of as few parts as possible and without expensive machine work.

Figure 1:
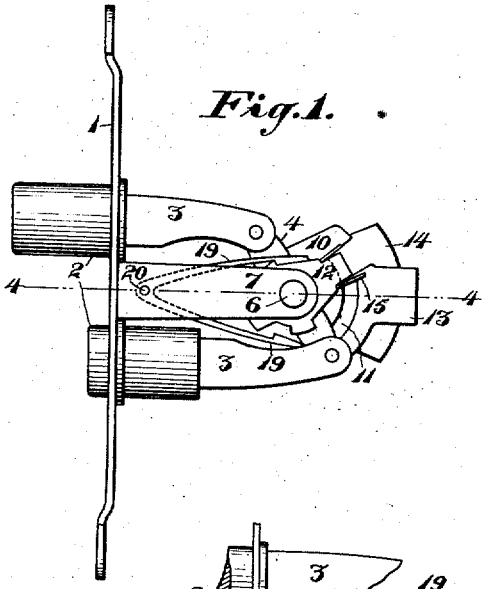
Figure 2:
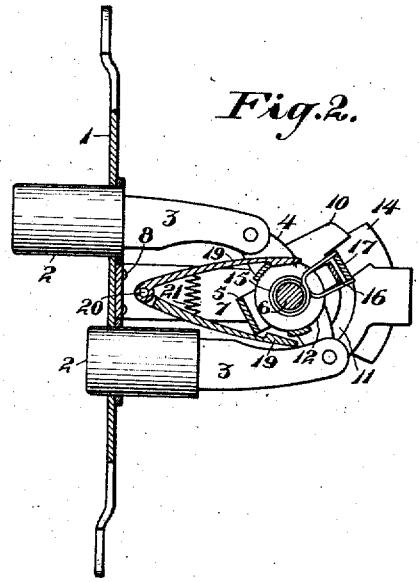
Figure 7:
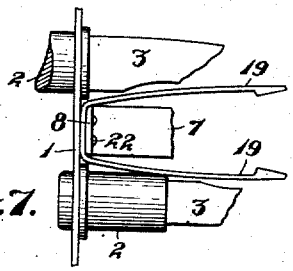
Figure 5:
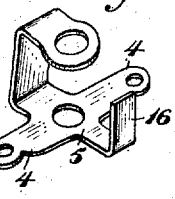
Figure 3:
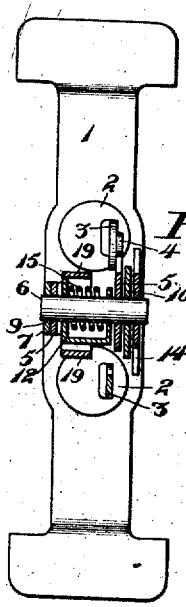
Figure 4:
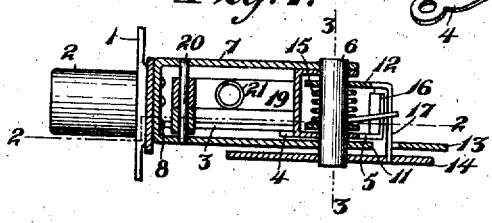
Figure 6:
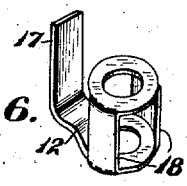

In the accompanying drawing, Figure 1 is a side elevation of the device; Fig. 2 is a vertical section on the line 2—2 of Fig. 4; Fig. 3 is a vertical section on the line 3—3 of Fig. 4; Fig. 4 is a horizontal section on the line 4—4 of Fig. 1; Fig. 5 is a perspective view of the controller; Fig. 6 is a perspective view of the shifter; Fig. 7 is a broken sectional view showing a modification of the hooks.

Referring to the drawing, 1 represents the supporting plate, which is of the usual form, and is generally placed within a porcelain casing supporting the spring contacts closed by the switch, but as these form no part of the present invention they are here omitted. Said plate is formed with the usual apertures to receive the push buttons 2, formed upon the outer ends of stems 3, the inner ends of which are pivoted to the ends of the arms 4 of a controller 5 loosely pivoted upon a shaft 6. To support said shaft 6 there is provided a U-shaped piece 7 of sheet metal, the central portion of which is riveted to the plate 1, as shown at 8, while the side members form posts and are apertured, one 9 at its end and the other 10 near its end, to form bearings for said shaft. The member 10 is extended and expanded in width beyond said aperture and has a curved guideway 11 for an arm of the shifter 12, hereinafter described. The extreme end 13 of said member can fit in a recess in the porcelain casing, not shown, for the purpose of forming a firm guide for the contact plate 14, so as to insure contact with the contact springs carried by the porcelain casing.

The controller is constructed to have a wide bearing on the shaft by bending it into a U-shape, or so as to have side members and a bridge connecting them, the side members both being perforated to permit the shaft 6 to pass loosely therethrough. With the same object the shifter 12 is given the same general form and its side members are perforated to permit the shaft 6 to pass loosely therethrough. Around the shaft 6 is a coiled spring 15 the ends of which are adapted to be engaged by arms 16 and 17 of the controller and shifter respectively, each extending inwardly from one side member toward the opposite side member of the shifter or controller, as the case may be. The arm 17 moves in the guideway 11, being arrested by the ends thereof, and engages the contact plate 14 swinging on the shaft 6.

The coiled spring lies between the side members of the shifter, while these lie between the side members of the controller. For the sake of lightness and convenience of construction the side members are joined by two bridges instead of one and the outer edges of these bridges form lips 18 which are alternately engaged by hooks 19 pivoted upon a shaft 20 secured between the sides of the piece 7 near the plate 1, and connected by a spring 21 which tends to draw both of them inward toward the controller. In the modification shown in Fig. 7 the two hooks are made out of a single piece of spring metal bent into a U-shaped form, the central portion 22 being riveted between the plate 1 and the piece 7.

The following is the operation of the device. Pressure being applied to whichever push button extends outermost, the controller is thereby rocked upon the shaft, carrying with it an end of the coiled spring and thereby energizing said spring, since the other end of the coiled spring is held immovable by the arm 17 of the shifter against which it presses, said shifter being held back by the hook 19 engaging the lip 18 of the shifter at the side from which the controller is moving. In the meantime the edge of the central portion of the controller abuts against the shank of said hook and presses the hook away from the shifter. As soon as said hook by said movement is thrown off the lip of the shifter, the spring immediately expands and the end engaged by the arm of the shifter throws the shifter the extent of its path. The opposite lip 18 of the shifter is now engaged by the other hook, and the shifter is now in the same position as before relatively to the other button.

The provision of the spring-actuated hooks, and the means for positively pushing either hook away from the shifter, to allow it to rock, is advantageous, since it enables the controller and shifter each to be made U-shaped in a single piece having a wide bearing on the shaft without the necessity of machine work, instead of, as heretofore, forming the wide bearing by securing together two pieces of metal and then machining the same.

I claim:—

1. In a device of the character described, the combination of a contact, a shaft upon which said contact rocks, a shifter also rocking on said shaft and operatively connected with said contact, a coiled spring around the shaft for energizing said shifter, and a controller having side members and a bridge connecting them, said opposite side members being pivoted on said shaft on opposite sides of the coiled spring, substantially as described.

2. In a device of the character described, the combination of a shaft, a contact rocking thereon, a shifter operatively connected with said contact to impart motion thereto, a coiled spring around the shaft, and a controller for energizing said coiled spring, the shifter having side members and a bridge connecting them formed in a single piece and having its opposite members pivoted upon the shaft on opposite sides of the coiled spring to provide a long bearing for said shifter, substantially as described.

3. In a device of the character described, the combination of a contact, a shaft upon which said contact rocks, a shifter also rocking on said shaft and operatively connected with said contact, a coiled spring around the shaft for energizing said shifter, and a controller also rocking on said shaft for energizing said coiled spring, said shifter and controller each having side members and a bridge connecting them, the coiled spring lying within the side members of the shifter, and the latter lying within the side members of the controller, substantially as described.

4. In a device of the character described, the combination of a contact, a shaft upon which said contact rocks, a shifter also rocking on said shaft and operatively connected with said contact, a coiled spring around the shaft for energizing said shifter, a pair of hooks alternately engaging the shifter to prevent movement of the same, and a controller energizing said spring and in its continued movement disengaging the engaging hook from the shifter, substantially as described.

5. In a device of the character described, the combination of a contact, a shaft upon which said contact is supported, a shifter rocking on said shaft and operatively connected with said contact, a coiled spring around the shaft for energizing said shifter, a controller also rocking on said shaft for energizing said spring, said shifter and controller each having side members and a bridge connecting them and the said shifter and controller each having its side members pivoted upon the shaft on the opposite sides of the coiled spring, substantially as described.

6. In a device of the character described, the combination of a shaft, means for supporting the said shaft, a bridge-containing device having its legs journaled upon the said shaft, a spring coiled around the said shaft and having its opposite ends crossed and located upon the opposite sides of the bridge portion of the said bridge-containing device, a second bridge-containing device, the legs of which are also journaled upon the said shaft, and the bridge portion of which is located between the opposite ends of the said spring, means for occasioning oscillation of the first-named device to place the spring under tension, a stop for preventing movement of the second device, and means for occasioning movement of the said stop to disengage the same from the said device and permit movement of the latter under the influence of the said spring, substantially as described.

7. In a device of the character described, the combination of a shaft, means for supporting the same, a bridge-containing device pivotally connected to the said shaft, means for occasioning movement of the said bridge-containing device, a spring coiled around the said shaft, the opposite ends of which are crossed and are located upon opposite sides of the bridge-containing device, a second bridge-containing device, pivotally connected to the said shaft, and one portion of which is also located between the opposite ends of the said spring, one part of the said device being arranged to form a trigger catch, a stop lever adapted to be engaged by the latter part of said second device, and a part upon the first named device which is adapted to occasion movement of the said stop lever into and out of alinement with the said part of the second device, whereby movement of the said second device may be occasioned by the said spring, substantially as described.

8. In a device of the character described, the combination of a contact member, a support for the said contact member, a shifter operatively connected to the said contact member, means associated with the said shifter for energizing it, a controller for energizing the said means, the said shifter and its said controller each having side members by which they are supported, and the side members of each being connected by a bridge, substantially as described.

In witness whereof I have hereunto set my hand in the presence of two subscribing witnesses.

EVERETT M. COFFIN.

Witnesses:
FRANCIS M. WRIGHT,
NELLIE B. KEATING.